United States Patent
Neveu et al.

(10) Patent No.: US 12,344,072 B2
(45) Date of Patent: Jul. 1, 2025

(54) THERMAL MANAGEMENT SYSTEM FOR A MOTOR VEHICLE

(71) Applicant: Valeo Systemes Thermiques, Le Mesnil Saint-Denis (FR)

(72) Inventors: Daniel Neveu, Le Mesnil Saint-Denis (FR); Omar Zoubairi, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 698 days.

(21) Appl. No.: 17/420,936

(22) PCT Filed: Jan. 7, 2020

(86) PCT No.: PCT/FR2020/050016
§ 371 (c)(1),
(2) Date: Jul. 6, 2021

(87) PCT Pub. No.: WO2020/144428
PCT Pub. Date: Jul. 16, 2020

(65) Prior Publication Data
US 2022/0072930 A1    Mar. 10, 2022

(30) Foreign Application Priority Data
Jan. 7, 2019 (FR) ..................... 1900120

(51) Int. Cl.
*B60H 1/00*    (2006.01)

(52) U.S. Cl.
CPC ....... *B60H 1/00742* (2013.01); *B60H 1/0073* (2019.05)

(58) Field of Classification Search
CPC ... B60H 1/00742; B60H 1/0073; F24F 11/64; F24F 11/80; G05D 23/1902
See application file for complete search history.

(56) References Cited

U.S. PATENT DOCUMENTS 4,829,447 A * 5/1989 Parker .................. F24F 11/30
                                                          700/277
5,170,935 A   12/1992 Federspiel et al.
(Continued)

FOREIGN PATENT DOCUMENTS

KR    100727184 B1 *  6/2007
WO    2016/070052 A1   5/2016
(Continued)

OTHER PUBLICATIONS

International Search Report and Written Opinion issued in corresponding International Patent Application No. PCT/FR2020/050016, mailed on May 12, 2020 (11 pages).
(Continued)

*Primary Examiner* — Nelson J Nieves
*Assistant Examiner* — Matthew John Moscola
(74) *Attorney, Agent, or Firm* — Osha Bergman Watanabe & Burton LLP

(57) ABSTRACT

The invention relates to a thermal management system for a passenger compartment of a motor vehicle, the system comprising a processing unit designed to determine an operative temperature setpoint TOC(t), also referred to as the operative comfort temperature, at a given time, and to use this operative temperature setpoint to manage the thermal comfort in the passenger compartment, said operative temperature setpoint TOC(t) at the given time (t) being a function of a reference operative temperature value (TOCRef), a variation DeltaCORP(t) of a physical build value CORP(t) of a person at the time (t) relative to a reference physical build value, a variation DeltaCLO(t) of a clothing value CLO(t) at the time (t) relative to a reference clothing value and a variation DeltaMET(t) of a value of the metabolic activity MET(t) at the time(t) relative to a value of the reference metabolic activity.

8 Claims, 2 Drawing Sheets

(56) References Cited

U.S. PATENT DOCUMENTS

| | | |
|---|---|---|
| 2002/0125334 A1 | 9/2002 | Remond et al. |
| 2012/0232715 A1 | 9/2012 | Vass et al. |
| 2013/0048263 A1 | 2/2013 | Nouvel et al. |
| 2014/0207292 A1* | 7/2014 | Ramagem .......... G05D 23/1902 700/278 |
| 2014/0338882 A1* | 11/2014 | Rollinson .......... B60H 1/00864 165/203 |
| 2016/0320081 A1 | 11/2016 | Nikovski |
| 2017/0123442 A1 | 5/2017 | Tsai et al. |
| 2017/0320457 A1* | 11/2017 | Kakimoto .............. H10N 10/17 |
| 2018/0135879 A1* | 5/2018 | Ota .......................... F24F 11/80 |
| 2018/0347845 A1 | 12/2018 | Harvey |
| 2018/0370329 A1* | 12/2018 | Ishizeki .................... F25B 6/04 |
| 2020/0172034 A1* | 6/2020 | Rowe .................. B60R 16/0237 |
| 2021/0215369 A1* | 7/2021 | Kurihara .................. F24F 11/63 |

FOREIGN PATENT DOCUMENTS

| | | |
|---|---|---|
| WO | 2016/202704 A1 | 12/2016 |
| WO | 2017016823 A1 | 2/2017 |
| WO | 2017/041921 A1 | 3/2017 |
| WO | WO-2018202984 A1 * | 11/2018 ........... B60H 1/0073 |

OTHER PUBLICATIONS

The First Office Action in corresponding Chinese Application No. 202080007704.5, dated Dec. 22, 2021 (14 pages).

* cited by examiner

THERMAL MANAGEMENT SYSTEM FOR A MOTOR VEHICLE

The invention relates to a thermal management system for a motor vehicle. The invention further relates to a thermal management method implemented by such a thermal management system.

In a motor vehicle, it is known to provide for management of flow rates, temperatures and distribution of air blown by the various diffusers depending on outside temperature and insolation conditions. In certain vehicles, this may be combined with the activation of a heated steering wheel and/or a heated or cooled seat, and sometimes with surfaces, such as an elbow rest, that heat via contact.

The present invention is intended to respond to rising expectations regarding comfort and well-being on board a vehicle, notably by increasing the capacity for adaptation to the requirements of each passenger.

The system according to the invention is intended, notably, to provide the following aspects.

These may relate to the capacity to adapt to the particular profile of each passenger, that is to say to take into account his particular expectations or preferences, together with his specific comfort field related to his personal profile (sex, age, ratio of muscle mass to fat, etc.) They may also relate to the capacity to take into account each context of use or of the state of passengers that may affect thermal comfort, including clothing, metabolism (digestion, sport, time, etc), stress, fatigue, etc.

Finally, they may relate to the capacity to take into account a wide variety of the thermal exchanges affecting the passengers, in terms of their nature (convection, radiation, contact) or location (head, neck, torso, arms, hands, back, thighs, legs, feet).

Thermal comfort in a motor vehicle interior is the result, notably, of the combination of numerous thermophysiological and thermal mechanisms and the interactions among them.

In particular, thermal comfort depends on the metabolic activity of a person, that is to say on the heat generated by the body as a result of the basic functioning of the organism (basal metabolism), its physical and cognitive activity (active metabolism), and metabolic processes in reaction to the thermal environment, such as vasoconstriction and shivering (thermogenesis).

Thermal comfort also depends on the person's clothing level, that is to say on both the ratio of covering of the skin by the clothes (usually about 85%) and the insulation provided of the clothes against heat transfer.

Thermal comfort also depends on the person's heat exchanges with his environment, by convection with the air, by infrared radiation with facing walls, and by direct contact with equipment, particularly the seat and the steering wheel. These exchange depend, notably, on the various temperatures of the air and of the facing walls, and on the air speeds in the vicinity of the body.

Thermal comfort also depends on the person's heat exchanges with his environment due to respiration and the associated transfer of humidity, and to perspiration and sweating through the skin. These exchanges depend on the metabolic activity as well as on the temperature and humidity of the air.

Thermal comfort also depends on the direct and indirect solar flux on the person, whether directly absorbed by the skin or absorbed by the clothing. It should be noted that, unlike the aforementioned convective and radiative exchanges, the absorbed solar flux does not depend on the temperature of the body and clothing.

In a conventional vehicle, the average comfort temperature in the interior is regulated by default to meet the thermal needs of a person referred to as "average", that is to say of average physical build, with an metabolic activity and a reference clothing level referred to as "average".

If the person is clothed in a particular way, notably in a swimming costume in summer or in an overcoat in winter, the temperature setpoint must be modified to keep the person comfortable.

If the person has a particular metabolic activity, notably if he is asleep, or is particularly stressed or has just been running before reaching the car, the temperature setpoint must again be modified to keep the person comfortable.

If the person has a small physical build (low weight and height), or a large physical build, the temperature setpoint must again be modified to keep the person comfortable.

The problem is then one of proposing a simple and effective strategy for adapting the setpoint temperatures on the basis of observable values of metabolic activity and/or clothing, combined if appropriate with other related information about the person, such as his physical build.

The invention is intended to provided better control and management of thermal comfort and well-being on board motor vehicles.

To this end, the invention relates to a thermal management system for a motor vehicle interior, the system comprising a processing unit arranged for determining an operative temperature setpoint $TOC(t)$, also referred to as the operative comfort temperature, at a given instant, and for using this operative temperature setpoint for managing thermal comfort in the interior, this operative temperature setpoint $TOC(t)$ at the given instant $(t)$ being a function of a reference operative temperature $(TOCRef)$, a variation $DeltaCORP(t)$ of a physical build value $CORP(t)$ of a person at the instant $(t)$ relative to a reference physical build value, a variation $DeltaCLO(t)$ of a clothing value $CLO(t)$ at the instant $(t)$ relative to a reference clothing value, and a variation $DeltaMET(t)$ of a metabolic activity value $MET(t)$ at the instant $(t)$ relative to a reference metabolic activity value.

The invention thus proposes a strategy for thermal comfort control in a motor vehicle interior which enables the setpoint temperature (or the operative comfort temperature) to be adjusted easily, rapidly and effectively as a function of the physical build CORP, the clothing level CLO and the metabolic activity MET of a passenger.

The invention starts from a situation in which the control system has already been set or calibrated to a reference operative comfort temperature TOCRef for a certain set of reference values relating to the passenger's physical build CORPRef, clothing CLORef and metabolism METRef.

The invention enables the comfort temperature to be adapted to the profile of the user.

In a highly advantageous manner, the invention enables the use of a comfort index to be dispensed with.

According to one of the aspects of the invention, the operative temperature setpoint $TOC(t)$ at the given instant $(t)$ is defined by the following relation: $TOC(t)=TOCRef+A(CORP,CLO,MET) \times DeltaCORP(t)+B(CORP,CLO,MET) \times DeltaCLO(t)+C(CORP, CLO, MET) \times DeltaMET(t)$, in which relation the coefficients $A(CORP,CLO,MET)$ $B(CORP,CLO,MET)$ and $C(CORP, CLO, MET)$ characterize the sensitivity of the setpoint temperature to a variation in physical build $CORP(t)$, clothing $CLO(t)$ and metabolism $MET(t)$ respectively, these coefficients depending, notably, on the passenger's physical build CORP and on the range within which CLO and MET vary.

According to an aspect of the invention, la physical build CORP is described by a function of the form CORP=$(P)^{x1}/(H)^{x2}$, where P is the weight and H is the height of the passenger, wherein, for example x1=1 and x2=1.

According to an aspect of the invention, the coefficients A, B and C are chosen to be constant within different ranges of variation of CLO and MET.

According to an aspect of the invention, the coefficient B of sensitivity to the variation of CLO is selected from a table which takes N discrete values, N preferably being equal to 9.

According to an aspect of the invention, the coefficient C of sensitivity to the variation of MET is selected from a table which takes N discrete values, N preferably being equal to 9.

Further features and advantages of the invention will become more clearly apparent on reading the following description, which is given by way of non-limiting illustrative example, and from the appended drawings, in which.

Figure 1:
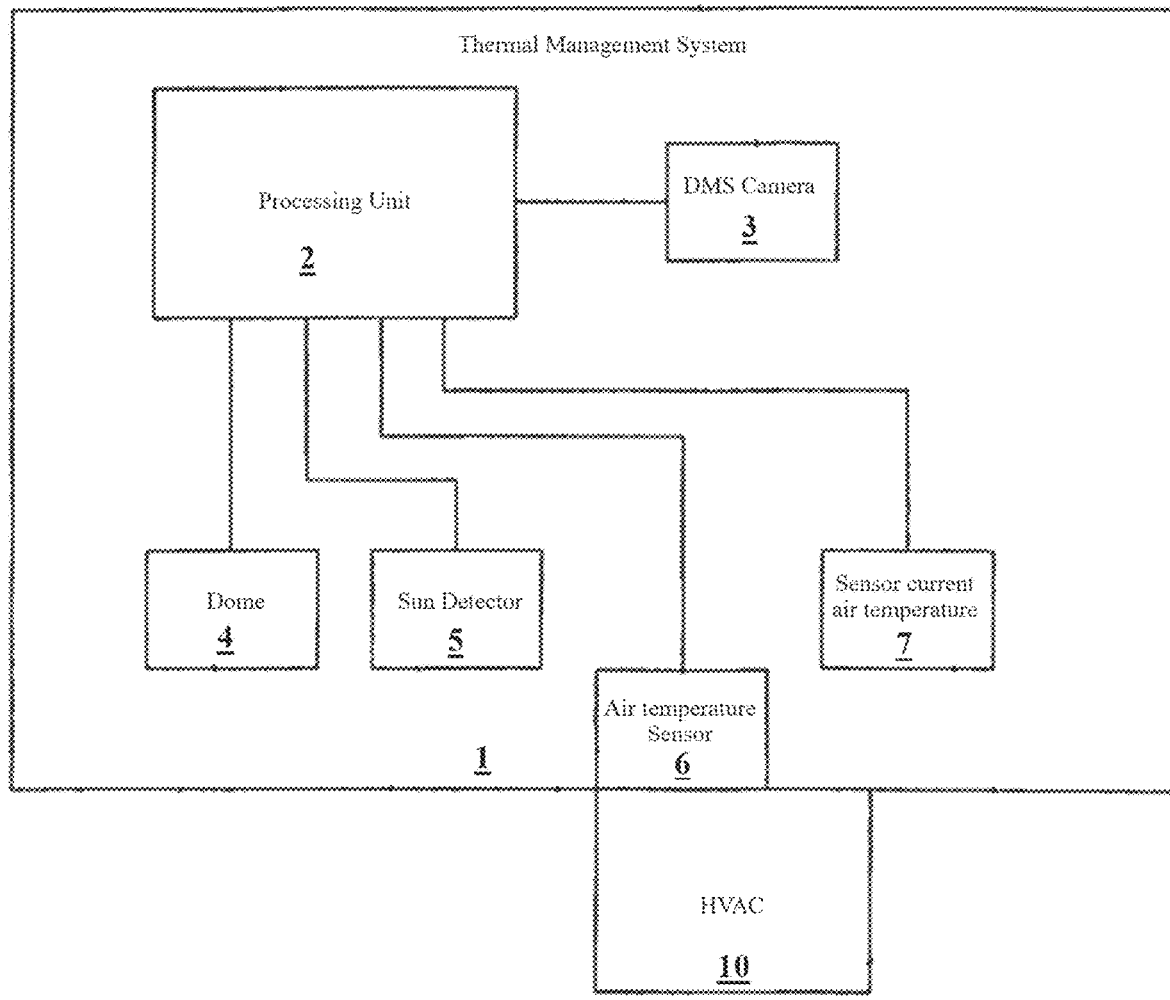
FIG. 1 shows a diagram of a system according to an example of the invention.

FIG. 1 shows a thermal management system 1 for a motor vehicle interior, the system comprising a processing unit 2 arranged for the following operations. One of the operations is that of acquiring a first datum (CLO) representative of the clothing level of a passenger in the interior. One of the other operations is that of acquiring a second datum (MET) representative of the passenger's metabolic activity. A final operation is that of acquiring a third datum (CORP) representative of the passenger's physical build.

The system 1 comprises a plurality of sensors arranged to measure a plurality of parameters serving to determine the first, second and third data.

These sensors comprise, notably, a DMS camera 3 arranged for observing a passenger in the interior, a dome 4 formed by at least one visible-light or infrared camera placed on a ceiling of the interior for viewing the passengers and measuring the temperatures of the walls of the interior and of certain parts of the passengers' bodies, a sun detector 5, at least one air temperature sensor 6 at the outlet of an air conditioning unit or of the HVAC 10, a sensor for detecting air flow rates and their distribution at the outlet of an air conditioning unit or of the HVAC 10, at least one sensor of the current air temperature 7 in the interior, preferably a humidity sensor and temperature sensors positioned in certain walls of the interior, and preferably a sensor of the heat flow in the areas in contact with the passengers.

The first datum (CLO) representative of the clothing level of the passenger in the interior corresponds to a measured insulation of the clothes worn by the passenger.

To this end, the system 1 is arranged to process an image taken by the camera 3 or the dome 4 and to determine, from this image, the type of clothes (T-shirt and/or shirt and/or pullover and/or overcoat and/or scarf and/or hat) worn by the passenger, notably via image recognition, the system 1 furthermore being arranged to determine the insulation from the type of clothes thus measured, and, if appropriate, from a measurement of the temperatures of the clothes and environment of the passenger.

A person's clothing level is usually expressed by a unit of measurement referred to as CLO.

For example, one CLO unit corresponds to clothing that provides an apparent overall insulation RClog of 0.155 m2.° C./W, chosen in such a way that, with this clothing, an "average" person, seated and at rest, is comfortable in an environment at 21° C. in still air with an average humidity of 50%.

For example, the apparent overall insulation of the clothing RClog allows for the fact that a part (% Cloth) of the body is not covered, but makes the assumption that the whole body is covered by a uniform thickness of clothing.

The apparent overall insulation RClog is therefore the result of a combination of an actual local insulation (RCloe) of the clothing on the covered part of the body (% Cloth) and a zero insulation on the uncovered parts (% Skin=1−% Cloth). For example, there is the following relation.

$$RCloe=RC\log/(\% \text{ Cloth}-\% \text{ Skin} \times RC \log \times H\text{ext})$$

Where Hext is the coefficient of apparent overall exchange by convection and radiation between the external surface of the body and the clothing and the external environment, characterized by its operative temperature TOpt.

It can be seen that, if the person is completely covered (% Clo=1), then RCloe=RClog.

The average insulation taken as the reference and as the default value is RClog=1 CLO.

The rate of covering % Cloth represents the part of the body covered by clothes, expressed as a percentage of the surface. Usually, the default value is % Cloth $\supseteq$89%, where the head and hands are not covered. This corresponds to indoor clothing, with "trousers+shirt+thin pullover".

A classification system is proposed to cover 9 typical clothing levels that can be identified by a video sensor.

The second datum (MET) representative of the passenger's metabolic activity is dependent on the profile (gender, age and physical build), the respiratory activity and the heart rate HR of the passenger, which are measured, notably, by the camera 3. If the respiratory activity or the heart rate HR cannot be measured, the second datum (MET) representative of the metabolic activity may be estimated on the basis of the posture and activity of the person detected by the camera 3 or the dome 4. In particular, it will vary according to whether the passenger is sleeping, at rest, is engaged in cognitive activity, is driving, or is very agitated.

A person's metabolic activity is measured by physiologists in kCal/hour/body weight in kg, which is homogeneous to a power divided by a weight. A unit of measurement of metabolism, referred to as MET, has been created, such that: 1 kCal/Hr/kg=1 MET. This unit may be converted to W/kg: 1 Met=1 kCal/Hr/kg=4180 joules/3600 s./Kg=1.162 W/kg This unit is such that an "average" person seated and at rest dissipates 1 Met.

The fact that metabolic activity is related to weight means that persons of different weights will have a similar metabolic activity per unit mass METp (the index "p" means related to weight) for the same activity. Thus, for a person at rest with a metabolism per unit weight: METp=1 Met. His total metabolic activity METt will depend on his weight (METt=METp×weight). For a person weighing 60 kg: METt=60×METp=60×1.16=70 W at rest. For a person weighing 90 kg: METt=100×1.16=116 W at rest.

In the heat balances for comfort, the exchanges are related to the surface area of the body.

The metabolic activity per unit of surface area, METs, is then used (the index "s" means related to the surface area of the body).

We find that METs=METp×(Weight of body/Surface area of body exchanging with the exterior)=METp×P/Se.

The surface area Se is not the total surface area St of the body, but only that which participates in the exchanges with the environment, that is to say a percentage % Surf of the total surface area: Se=% Surf×St.

The total surface area of the body St can be approximated by the Dubois formula: St=0.20247*Height0.725*Weight0.425, with the height in metres and the weight in kg.

The Dubois surface area of an "average" person is 1.8 m2 (for a weight of 70 kg and a height of 1.7 m).

The average metabolic activity taken as the reference and as the default value in a vehicle is 1.2 Met. It is equal to a value intermediate between a person at rest (1 Met) and a person who is driving, that is to say with a gentle level of cognitive and physical activity (1.4 Met).

A classification system is proposed, to cover 9 typical metabolic activity levels that can be identified by the combination of video sensors and physiological sensors.

Figure 2:
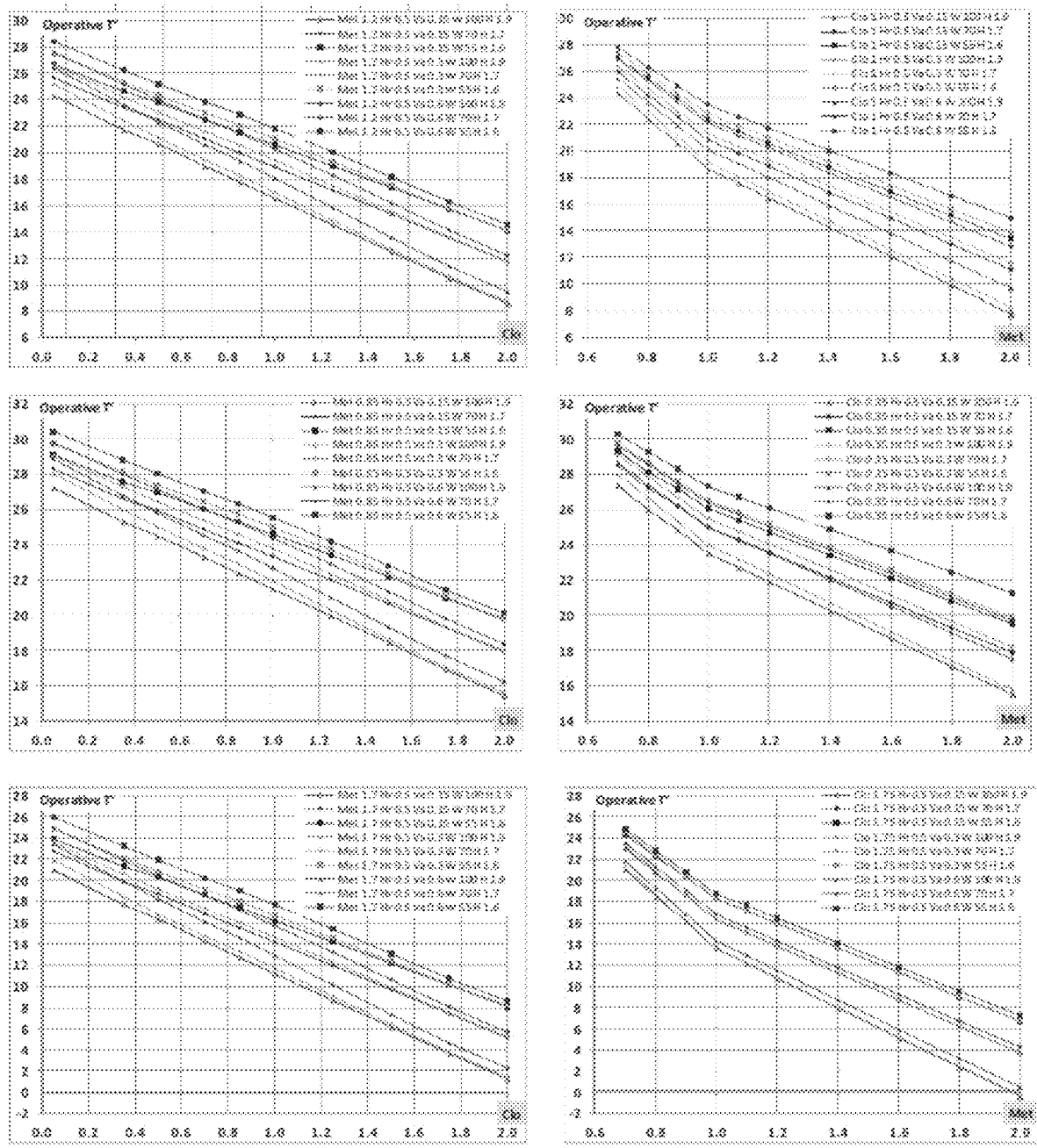
FIG. 2 shows graphs of the variation of the operative temperature setpoint as a function of different parameters according to the invention.

The diagrams shown in FIG. 2 display the variation of operative temperature TOC (vertical axis) as a function of CLO, varying between 0.05 and 2; of MET, varying between 0.7 and 2; of weight W and of height H, with three typical sets: W & H low=55×1.6, W & H medium=70×1.7, W & H high=100×1.9; of humidity Hr, here taken to be at a median value of 50%; and of the average air speed Va, varying between 0.15 m/s (still air) and 0.6 m/s (high ventilation).

The first two diagrams show the effect of CLO and MET when the associated values of Met and Clo are close to the mean reference, i.e. Met=1.2 and Clo=1.

The third and fourth diagrams show the effect of CLO and MET when the associated values of Met and Clo are in a low range, i.e. Met=0.85 and Clo=0.35.

The fifth and sixth diagrams show the effect of CLO and MET when the associated values of Met and Clo are in a high range, i.e. Met=1.7 and Clo=1.75.

It can be seen that the slope is linear overall and only varies to a small extent over a wide range of variation of CLO and MET. The sensitivity slope may be approximated by a value which depends only on physical build CORP (i.e. on W and H) over 9 ranges of CLO and MET.

In a central range, associated with the conditions of highest occurrence, that is to say with Met between 1 and 4 and CLO between 0.7 and 1.5, the sensitivity is found to increase la physical build, with a difference of more than 20% between a stout person and a slim person.

In this range, the sensitivity to MET is also found to be close to 10, meaning that a variation of 0.1 Met will be compensated by a variation of ~1° C. in the operative temperature. Specifically, there may be a difference of 0.4 Met, and therefore of 4° in the operative comfort temperature, between an inactive person at rest and a person driving.

In this range it is also found that the sensitivity to CLO is close to 8, meaning that a variation of 0.2 Clo will be compensated by a variation of about 1.5° C. in the operative temperature. Thus, there may be a difference of 0.6 Clo, and therefore of 4° to 5° in the operative comfort temperature, between a person in "casual" clothes, wearing trousers and a shirt (Clo ~0.7), and a person in a three-piece suit (Clo ~1.25).

It is also found, over the whole diagram, that the sensitivity to MET increases strongly if CLO is high, the sensitivity to CLO increases strongly if MET is high, and the sensitivity to MET is higher for MET <1 than for MET >1, mainly due to the fact that the contribution of respiration and sweating is reduced at low metabolism. Thus it may be noted that a person who is asleep (Met=0.7 to 0.9) may require a temperature 3° C. to 4° C. higher than a person at rest.

The invention claimed is:

1. A thermal management system for a motor vehicle interior, the system comprising: a processing unit arranged for:
   determining an operative temperature setpoint TOC(t), at a given instant (t), and using this operative temperature setpoint for managing thermal comfort in the interior, wherein the operative temperature setpoint TOC(t) at the given instant (t) is a function of:
   a reference operative temperature value (TOCRef),
   a variation DeltaCORP(t) of a physical build value CORP(t) of a passenger at the given instant (t) relative to a reference physical build value,
   a variation DeltaCLO(t) of a clothing value CLO(t) at the given instant (t) relative to a reference clothing value,
   a variation DeltaMET(t) of a metabolic activity value MET (t) at the given instant (t) relative to a reference metabolic activity value, and
   A (CORP, CLO, MET)×DeltaCORP(t), B (CORP, CLO, MET)×DeltaCLO(t), and C(CORP, CLO, MET)×DeltaMET(t),
   wherein coefficients A(CORP, CLO, MET), B(CORP, CLO,MET), and C(CORP, CLO, MET) characterize a sensitivity of the setpoint temperature to a variation in physical build value CORP(t), clothing value CLO(t), and metabolism activity value MET (t), respectively, and
   wherein the DeltaCORP(t), DeltaCLO(t) and DeltaMET(t) represent a variation of a physical build value CORP(t) of a passenger at the given instant (t) relative to a reference physical build value.

2. The system as claimed in claim 1, wherein the passenger's physical build CORP(t) is described by a function CORP=(P)$^{x1}$/(H)$^{x2}$, where P is a weight of the passenger, H is a height of the passenger, x1=1, and x2=1.

3. The system as claimed in claim 1, wherein the coefficients A (CORP, CLO, MET), B (CORP, CLO, MET), and C (CORP, CLO, MET) are chosen to be constant within different ranges of variation of CLO (t) and MET d(t).

4. The system as claimed in claim 1, wherein the coefficient B (CORP, CLO, MET) of sensitivity to the variation of CLO(t) is selected from a table which takes N discrete values, N being equal to 9.

5. The system as claimed in claim 1, wherein the coefficient C (CORP, CLO, MET) of sensitivity to the variation of MET (t) is selected from a table which takes N discrete values, N being equal to 9.

6. A thermal management system for a motor vehicle comprising:
   a plurality of sensors configured to acquire first data associated with a variation DeltaCLO(t) of a clothing value CLO(t) of a passenger at a given instant (t) relative to a reference clothing value, second data associated with a variation DeltaCORP(t) of a physical build value CORP(t) of the passenger at the given instant (t) relative to a reference physical build value, and a third data associated with a variation DeltaMET (t) of a metabolic activity value MET (t) of the passenger at the given instant (t) relative to a reference metabolic activity value;
   a processing unit configured to:
   calculate an operative temperature setpoint TOC(t) at the given instant (t) in time for the passenger based on a reference operative temperature value (TOCRef), at least the first data, the second data, the third data, and wherein TOC(t) at the given instant (t) is a function of A (CORP, CLO, MET)×DeltaCORP(t), B (CORP, CLO, MET)×DeltaCLO(t), and C(CORP, CLO, MET)×DeltaMET(t), in which coefficients A(CORP, CLO, MET), B(CORP,CLO,MET), and C (CORP, CLO, MET) characterize a sensitivity of the setpoint temperature to a variation in physical build value CORP(t), clothing value CLO(t), and metabolism activity value MET (t), respectively, wherein the DeltaCORP(t), DeltaCLO(t) and DeltaMET(t) represent a variation of a physical build value CORP(t) of a passenger at the given instant (t) relative to a reference physical build value; and adapt the operative temperature setpoint to a profile of the passenger based on the first data, second data, and third data and the plurality of parameters for optimal thermal comfort of the passenger.

7. The thermal management system of claim 6, wherein the plurality of sensors comprise:

a camera arranged for observing the passenger, a dome formed by at least one visible-light or infrared camera placed on a ceiling of an interior of the motor vehicle for viewing the passenger and measuring temperatures of walls of the interior and of certain parts of the passenger, a sun detector configured to determine a solar flux of the passenger, at least one air temperature sensor at an outlet of an air conditioning unit or of a HVAC, a sensor for detecting air flow rates and air flow rate distribution at the outlet of the air conditioning unit or of the HVAC, at least one sensor of a current air temperature in the interior, wherein the at least one sensor of the current air temperature comprises a humidity sensor and temperature sensors positioned in certain walls of the interior.

8. The thermal management system of claim 6, wherein the thermal management system is calibrated to a reference operative comfort temperature for a set of reference values comprising an occupant's physical build, clothing, and metabolism.

* * * * *